(12) United States Patent
Takikawa et al.

(10) Patent No.: US 7,754,177 B2
(45) Date of Patent: Jul. 13, 2010

(54) CARBON NANOBALLOON STRUCTURE AND METHOD FOR PREPARATION THEREOF, AND ELECTRON EMITTER

(75) Inventors: Hirofumi Takikawa, (1-104), 1-3, Aza Uehara, Ogasaki-chi, Toyohashi-shi, Aichi 441-8066 (JP); Akira Kondo, Tokyo (JP); Kazuo Yoshikawa, Tokyo (JP); Shigeo Itoh, Mobara (JP)

(73) Assignees: Hirofumi Takikawa, Toyohashi-shi, Aichi (JP); Tokai Carbon Co., Ltd., Tokyo (JP); Futaba Corporation, Mobara-shi, Chiba (JP)

( * ) Notice: Subject to any disclaimer, the term of this patent is extended or adjusted under 35 U.S.C. 154(b) by 418 days.

(21) Appl. No.: 10/594,368

(22) PCT Filed: Mar. 25, 2005

(86) PCT No.: PCT/JP2005/006441

§ 371 (c)(1),
(2), (4) Date: Sep. 27, 2006

(87) PCT Pub. No.: WO2005/095275

PCT Pub. Date: Oct. 13, 2005

(65) Prior Publication Data

US 2007/0207081 A1 Sep. 6, 2007

(30) Foreign Application Priority Data

Mar. 30, 2004 (JP) .............................. 2004-097875

(51) Int. Cl.
*B01J 19/08* (2006.01)
(52) U.S. Cl. .............................. 423/445 B; 423/447.8; 423/447.2
(58) Field of Classification Search .................. 423/445, 423/447.8, 447.2, 445 B
See application file for complete search history.

(56) References Cited

U.S. PATENT DOCUMENTS 6,692,718 B1 * 2/2004 Osawa ........................ 423/448

2003/0188963 A1 * 10/2003 Takikawa et al. ............ 204/164

FOREIGN PATENT DOCUMENTS

| CN | 1456497 | 11/2003 |
|---|---|---|
| JP | 2000-500906 | 1/2000 |
| JP | 2000-268707 | 9/2000 |
| JP | 2002-326032 | 11/2002 |
| JP | 2003-016920 | 1/2003 |
| JP | 2003-300713 | 10/2003 |
| JP | 2004-060130 | 2/2004 |

OTHER PUBLICATIONS

Guochun Xu, Carbon Nanoballoon Produced by Thermal Treatment of Arc Soot, New Diamond and Frontier Carbon Technology, vol. 15, No. 2 2005, MYU Tokyo.*
Guochun Xu, Carbon Nanoballoon Produced by Thermal Treatment of Arc Soot, 2005, New Diamond and Frontier Carbon Technology, vol. 15, No. 2, p. 73, 80.*
Peigney, Specific surface area of carbon nanotubes and bundles of carbon nanotubes, May 18, 2000, Pergamon, Carbon 39 (2001)507-514.*
Donnet, Etude De La Microstructure, Mar. 26, 1968, Pergamon, Carbon 1968, vol. 6, p. 781-788.*
Saito, Hollow and filled rectangular parallelopiped carbon nanocapsules catalyzed by calcium and strontium, Oct. 28, 1997, Science Direct, Elsevier Science 1998, Dept. of Electrical and Electronic Engineering, Mie University., Journal of Crystal Growth, vol. 187, Issue3-4, May 15, 1998, p. 402-409.*
"Hollow and filled rectangular parallelopiped carbon nanocapsules catalyzed by calcium and strontium" by Y. Saito et al, *Journal of Crystal Growth*, vol. 187, (1998), pp. 402-409.

* cited by examiner

*Primary Examiner*—Timothy C Vanoy
*Assistant Examiner*—Michelle Hou
(74) *Attorney, Agent, or Firm*—Flynn, Thiel, Boutell & Tanis, P.C.

(57) ABSTRACT

A hollow carbon nanoballoon structure having a relatively large closed space, and a method of producing a carbon nanoballoon structure capable of easily and stably producing such a structure. The carbon nanoballoon structure is obtained by heating soot prepared by an arc discharge using carbon electrodes, soot prepared by vaporizing carbon by laser irradiation, or carbon black having a specific surface area of 1000 m2/g or more and a primary particle diameter of 20 nm or more at a high temperature in an inert gas atmosphere, and includes graphite sheets linked to form a curved surface.

2 Claims, 8 Drawing Sheets

OPENING

CARBON NANOBALLOON STRUCTURE AND METHOD FOR PREPARATION THEREOF, AND ELECTRON EMITTER

TECHNICAL FIELD

The present invention relates to a hollow carbon nanoballoon structure, a method of producing the same, and an electron emitter.

BACKGROUND ART

A carbon material (fullerene soot) having a nanometer-sized microstructure is contained in soot prepared by vaporizing carbon by arc discharge using graphite electrodes or laser irradiation to carbon in an inert atmosphere, and allowing the vaporized carbon to aggregate through gradual cooling. As the configuration of fullerene soot, a single-wall sphere represented by $C_{60}$, a multiwall sphere having a small void formed therein (carbon nanoparticle), a single-wall tube contained in soot prepared by vaporizing carbon by an arc discharge using graphite in which a specific metal catalyst is mixed (single-wall carbon nanotube), and a multiwall tube in which several single-wall nanotubes are concentrically arranged (multiwall carbon nanotube: deposited on the surface of the cathode when using graphite in which a metal catalyst is not mixed) have been known.

These carbon materials are expected to find applications in new material fields. As a technology of producing these carbon materials, JP-A-2001-48508 discloses a method which includes applying a high-energy beam such as electron beams, γ-rays, or X-rays to carbon soot prepared by incomplete combustion or pyrolysis of a carbon-containing compound such as a hydrocarbon or an aromatic oil to obtain nanometer-sized graphite spheres, and JP-A-2001-64004 discloses a method which includes applying laser light to a solid carbon material such as sintered carbon in an inert gas atmosphere to vaporize carbon, suspending and dispersing the resulting soot-like material in a solvent, and collecting individual or aggregated spherical particles to obtain single-wall carbon nanohorns. JP-A-2003-206120 discloses a method which includes applying a carbon dioxide laser beam to carbon in an inert gas atmosphere at 5 to 10 atm to produce cluster carbon heated to 1000° C. or more to obtain nanographite spheres.

A material obtained by the above methods has a solid structure or a structure having minute voids formed therein, and is expected to be applied as a light-absorbing material, an ultrahard material, a hydrogen storage material, a methane gas storage material, a gas reforming material, an abrasive, a lubricant, and other new functional materials. On the other hand, if a nanometer-sized hollow carbon structure having a larger inner space can be obtained, such a structure can be applied to a wider range of product fields due to the structural feature of having a graphite outer shell and a hollow inner space.

As a method of producing a nanometer-sized hollow carbon structure, JP-A-2000-344506 discloses a method of producing a carbon nanocapsule containing a metal particle by bringing a gas mixture containing carbon dioxide and hydrogen into contact with a transition metal catalyst containing metal particles at a reaction temperature of 450 to 750° C. to subject carbon dioxide to catalytic reduction, and JP-A-2003-81619 discloses a method of producing a carbon nanocapsule with an outer diameter of 100 nm or more by supplying a raw material gas containing carbon to a glow discharge plasma generated by microwaves to decompose the raw material gas.

The carbon nanocapsule obtained by the former method contains a metal in the hollow space, and the carbon nanocapsule obtained by the latter method contains a Co particle and is used to produce a recording medium by causing the nanocapsule to adhere to a disc or to confine a luminescent material or an optical material. These carbon nanocapsules do not have a completely closed space. A carbon polyhedron having a polyhedral structure in which several to several tens of graphite sheets are nested may be obtained by arc discharge (see Chem. Phys. Lett. 204. 227 (1993)). Since the carbon polyhedron does not necessarily have a hollow inner space and has a relatively small particle diameter ranging from several to several tens of nanometers, a number of substances cannot be provided in the carbon polyhedron. Specifically, a method of efficiently and stably obtaining a nanometer-sized hollow carbon structure having a large inner space has not yet been put into practice.

DISCLOSURE OF THE INVENTION

Figure 1:
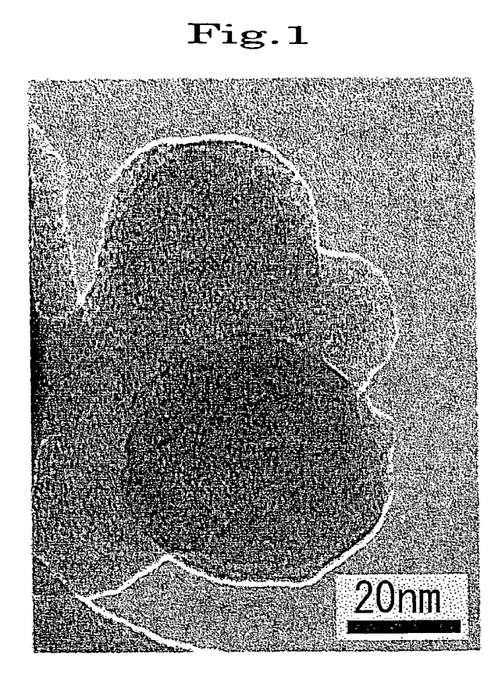
FIG. 1 is a transmission electron microscope (TEM) photograph showing cocoon-like carbon contained in soot prepared by arc discharge using carbon electrodes or soot prepared by vaporizing carbon by laser irradiation.
Figure 2:
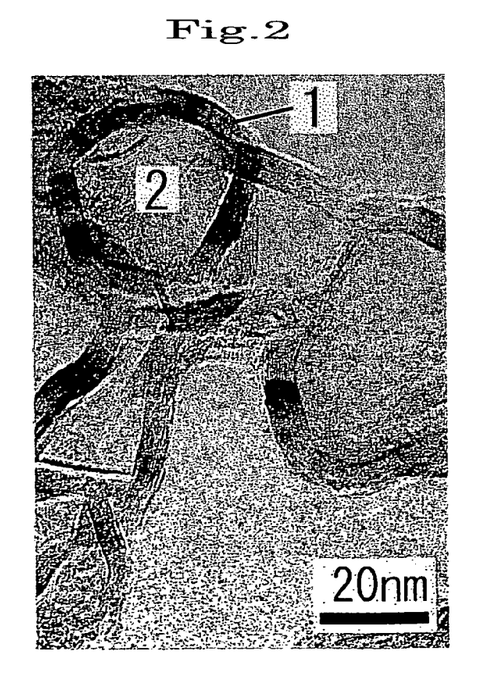
FIG. 2 is a TEM photograph showing carbon nanoballoon structures produced by heating the soot shown in FIG. 1 at a high temperature, that is, hollow carbon nanoballoon structures including graphite sheets linked to form a curved surface and entirely or partially having various shapes such as a sphere, a gourd-like shape, or a triangular pyramidal shape.

The inventors of the present invention have conducted tests and studies aiming at obtaining a nanometer-sized hollow carbon structure having a large inner space. As a result of observation of soot prepared by arc discharge using carbon electrodes and soot prepared by vaporizing carbon by laser irradiation (ablation, hereinafter the same), the inventors have found that cocoon-like carbon as shown in FIG. 1 is present in the soot, and heating the cocoon-like carbon at a high temperature in an inert gas atmosphere produces hollow carbon nanoballoon structures having various shapes such as a sphere, a gourd-like shape, or a triangular pyramidal shape as shown in FIG. 2 through self organization.

The present invention has been achieved based on the above finding. An object of the present invention is to provide a hollow carbon nanoballoon structure having a relatively large closed space, and a method of producing a carbon nanoballoon structure capable of easily and stably producing such a structure. Another object of the present invention is to provide an electron emitter with excellent electron emission properties as a preferred application example of such a carbon nanoballoon structure.

A hollow carbon nanoballoon structure according to the present invention which achieves the above object comprises graphite sheets linked to form a curved surface and has a diameter of 20 to 500 nm. The diameter used herein refers to a value obtained by averaging the length of the structure in a direction of an X-axis passing through the center of the structure and the length of the structure in a Y-axis direction passing through the center and perpendicularly intersecting the X-axis.

The above carbon nanoballoon structure has a number of the graphite sheets of 1 to 30 and/or a void content of 30 to 99%. The void content is determined by calculating the diameter of the structure by averaging the length of the structure in the direction of the X-axis passing through the center of the structure and the length of the structure in the direction of the Y-axis passing through the center and perpendicularly intersecting the X-axis, approximating the volume of the structure as a sphere, calculating the diameter of the hollow portion by subtracting a value twice the thickness of the graphite sheet (graphene, hereinafter same) from the diameter of the structure, approximating the volume of the hollow portion as a sphere, and calculating (volume of the hollow portion/volume of the structure)×100%.

In the above carbon nanoballoon structure, an opening (pinhole) reaching the hollow portion is formed in the structure.

A method of producing a carbon nanoballoon structure according to the present invention comprises heating soot prepared by an arc discharge using carbon electrodes, soot prepared by vaporizing carbon by laser irradiation, or carbon black having a specific surface area of 1000 m$^2$/g or more and a primary particle diameter of 20 nm or more at a high temperature in an inert gas atmosphere.

In the above method of producing a carbon nanoballoon structure, the arc discharge using the carbon electrodes or the laser irradiation is performed in a nitrogen atmosphere, an oxygen atmosphere, a hydrogen atmosphere, or a mixed atmosphere of two or more gases selected from nitrogen, oxygen, and hydrogen, and the resulting soot partially includes a carbon nanohorn.

An electron emitter according to the present invention is an electron emitter which emits electrons upon application of an electric field between an extractor electrode and a cathode electrode positioned close to the extractor electrode and including an emitter material, the emitter material including the above carbon nanoballoon structure.

According to the present invention, a hollow carbon nanoballoon structure having a relatively large closed space and a method of producing a carbon nanoballoon structure capable of easily and stably producing such a structure are provided. Since the carbon nanoballoon structure according to the present invention has a graphite outer shell, the carbon nanoballoon structure exhibits excellent electrical conductivity, excellent lubricity, high heat resistance, chemical stability, and excellent chemical resistance. Since the carbon nanoballoon structure is hollow, the carbon nanoballoon structure exhibits a low bulk density and excellent insulating properties.

BRIEF DESCRIPTION OF THE DRAWINGS

FIG. 3 and FIG. 1 show the same sample. FIG. 3 is a low-magnification photograph of FIG. 1.

FIG. 5 is a TEM photograph after heating the soot shown in FIG. 1 at 2000° C. A graphite sheet is formed as the outer shell in about 80% of the particles. Some of the particles have become hollow.

FIG. 6 is a TEM photograph after heating the soot shown in FIG. 1 at 2400° C. A graphite sheet is formed as the outer shell in most of the particles. Most of the particles have become hollow.

FIG. 7 is a TEM photograph after heating the soot shown in FIG. 1 at 2800° C. A graphite sheet is formed as the outer shell in most of the particles. Most of the particles have become hollow. FIG. 7 and FIG. 2 show the same sample. FIG. 7 is a low-magnification photograph of FIG. 2.

BEST MODE FOR CARRYING OUT THE INVENTION

The carbon nanoballoon structure according to the present invention is produced by heating soot prepared by an arc discharge using carbon electrodes (preferably graphite electrodes), soot prepared by vaporizing carbon (preferably graphite) by laser irradiation, or carbon black having a specific surface area of 1000 m$^2$/g or more and a primary particle diameter of 20 nm or more at a high temperature in an inert gas atmosphere containing nitrogen or a rare gas such as argon or helium. As shown in FIG. 2, hollow carbon nanoballoon structures having various shapes such as a sphere, a gourd-like shape, or a triangular pyramidal shape (triangle with three curved vertices) are obtained. As shown in FIG. 2, the carbon nanoballoon structure includes an outer shell 1 having a graphite structure which is indicated by the dark area in the TEM photograph, and an inner hollow portion 2 which is indicated by the light area surrounded by the dark area in the TEM photograph. A plurality of carbon nanoballoon structures are bonded to form a structure. These structures aggregate to form a powder in a macroscopic observation. The indicator line and the reference numerals are provided in the TEM photograph shown in FIG. 2 for convenience.

As described above, cocoon-like carbon as shown in FIG. 1 which serves as a precursor of the carbon nanoballoon structure is present in soot prepared by an arc discharge using carbon electrodes or soot prepared by vaporizing carbon by laser irradiation, as described above. As the atmosphere used to synthesize the precursor, nitrogen, oxygen, hydrogen, or a mixture of two or more gases selected from nitrogen, oxygen, and hydrogen is preferable. The precursor is obtained by an arc discharge using carbon electrodes or laser irradiation to carbon in such an atmosphere. The resulting soot partially contains the above-mentioned carbon nanohorns. When synthesizing the precursor in nitrogen or hydrogen, the amount of soot synthesized increases. When synthesizing the precursor in oxygen, refuse such as carbon fragments mixed during synthesis can be removed to a certain extent.

The inventors have focused on the phenomenon in which the above-mentioned cocoon-like carbon changes into the carbon nanoballoon structure by heating at a high temperature, and conducted tests and studies on a carbon material which undergoes a similar phenomenon. As a result, the inventors have found that carbon black having a specific surface area of 1000 $m^2/g$ or more and a primary particle diameter of 20 nm or more changes into a carbon nanoballoon structure having a similar structure by heating the carbon black at a high temperature in an inert gas atmosphere. Ketjenblack is commercially available as such a carbon black.

Figure 3:
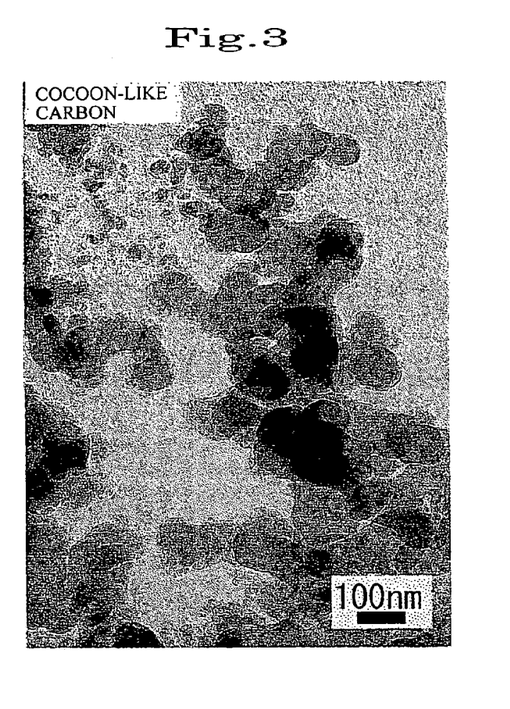
FIG. 3 is a TEM photograph before heating the soot shown in FIG. 1 at a high temperature. A graphite sheet is not observed, and the structure is solid.
Figure 4:
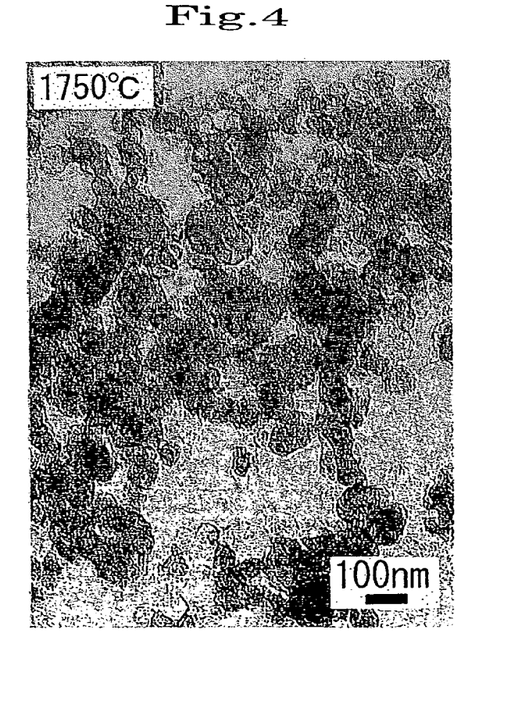
FIG. 4 is a TEM photograph after heating the soot shown in FIG. 1 at 1750° C. A graphite sheet is formed as the outer shell in about 20% of the particles. The particles are still solid.
Figure 5:
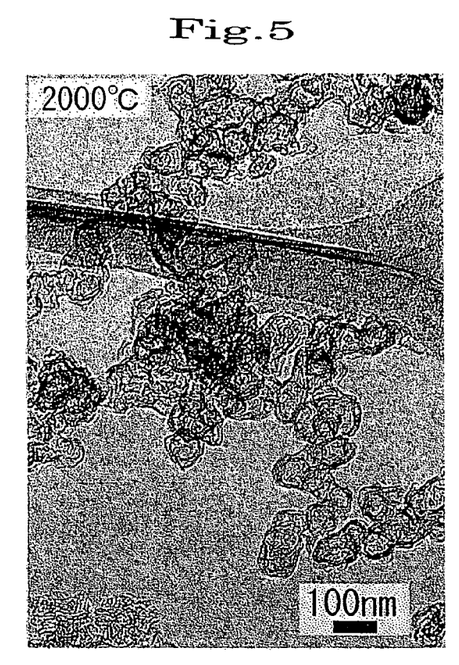

A process in which cocoon-like carbon changes into the carbon nanoballoon structure was observed using a transmission electron microscope (TEM) while changing the heating temperature when heating soot prepared by an arc discharge using carbon electrodes at a high temperature in an inert gas atmosphere. The results are shown in FIGS. 3 to 7. FIG. 3 shows the cocoon-like carbon before heating at a high temperature. A graphite sheet is not observed, and the cocoon-like carbon is solid. FIG. 3 and FIG. 1 show the same sample. FIG. 3 is a low-magnification photograph of FIG. 1. FIG. 4 shows the state after heating at 1750° C. A graphite sheet is formed as the outer shell in about 20% of the particles. The particles are still solid. FIG. 5 shows the state after heating at 2000° C. A graphite sheet is formed as the outer shell in about 80% of the particles. Some of the particles have become hollow.

Figure 6:
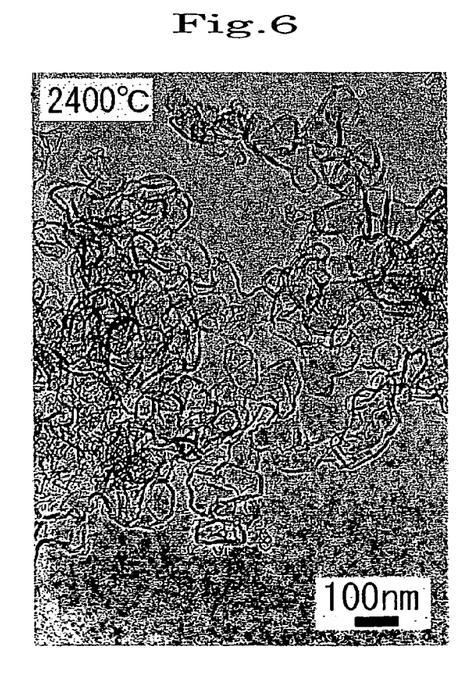
Figure 7:
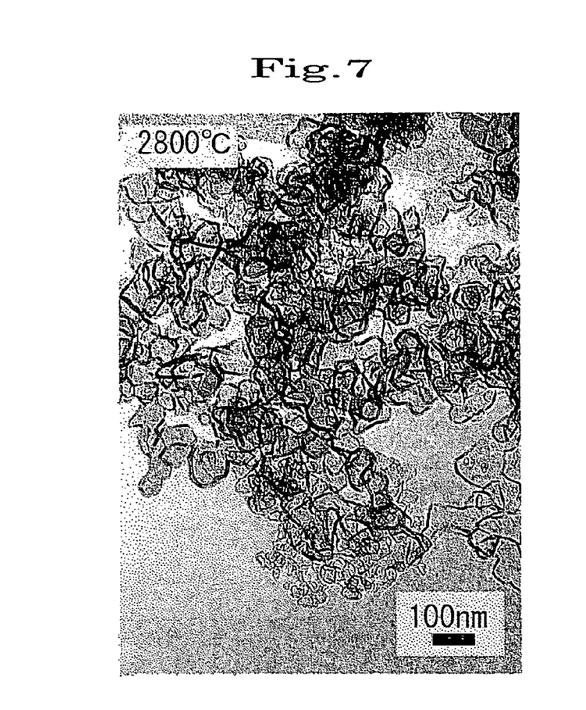

FIG. 6 shows a state after heating at 2400° C. A graphite sheet is formed as the outer shell in most of the particles. Most of the particles have become hollow. FIG. 7 shows the state after heating at 2800° C. A graphite sheet is formed as the outer shell in most of the particles in the same manner as in FIG. 6. Most of the particles have become hollow. FIG. 7 and FIG. 2 show the same sample. FIG. 7 is a low-magnification photograph of FIG. 2. Therefore, it was found that the heating temperature for obtaining the carbon nanoballoon structure is preferably 2000° C. or more, and still more preferably 2400° C. or more.

The above-mentioned carbon nanohorns and the like are also contained in soot prepared by an arc discharge using carbon electrodes or soot prepared by vaporizing carbon by laser irradiation. As a result of tests, it was found that a significant change in the weight of the soot did not occur before and after heating at a high temperature in an inert gas atmosphere. Therefore, it was confirmed that the carbon contained in the soot including the carbon nanohorns other than refuse such as carbon fragments mixed during synthesis completely changed into the carbon nanoballoon structure by heating at a high temperature in an inert gas atmosphere.

The hollow carbon nanoballoon structures obtained by the above method include graphite sheets arranged to form a curved surface and entirely or partially have various shapes such as a sphere, a gourd-like shape, or a triangular pyramidal shape, as described above.

The number of graphite sheets is 1 to 30 (single layer or a plurality of layers), and the diameter of the carbon nanoballoon structure is 20 to 500 nm. The void content of the hollow carbon nanoballoon structure is 30 to 99%. The diameter used herein refers to a value obtained by averaging the length of the structure in the direction of the X-axis passing through the center of the structure and the length of the structure in the direction of the Y-axis passing through the center and perpendicularly intersecting the X-axis. The void content is determined by approximating the volume of the structure as a sphere based on the diameter, calculating the diameter of the hollow portion by subtracting a value twice the thickness of the graphite sheet from the diameter of the structure, approximating the volume of the hollow portion as a sphere, and calculating (volume of the hollow portion/volume of the structure)×100%.

In the present invention, a structure in which two or more carbon nanoballoon structures are bonded or a structure in which two or more carbon nanoballoon structures are bonded and which has a DBP absorption of 30 to 500 ml/100 g may also be obtained by changing the production conditions.

When using the carbon nanoballoon structure according to the present invention as a capsule, an opening (pinhole) reaching the hollow portion is formed in the structure. As the method of forming the opening, it is preferable to use a method of oxidizing the carbon nanoballoon structure in an oxygen-containing atmosphere, which is generally used to form an opening in a carbon nanotube, a carbon nanohorn, or a fullerene.

Figure 8:
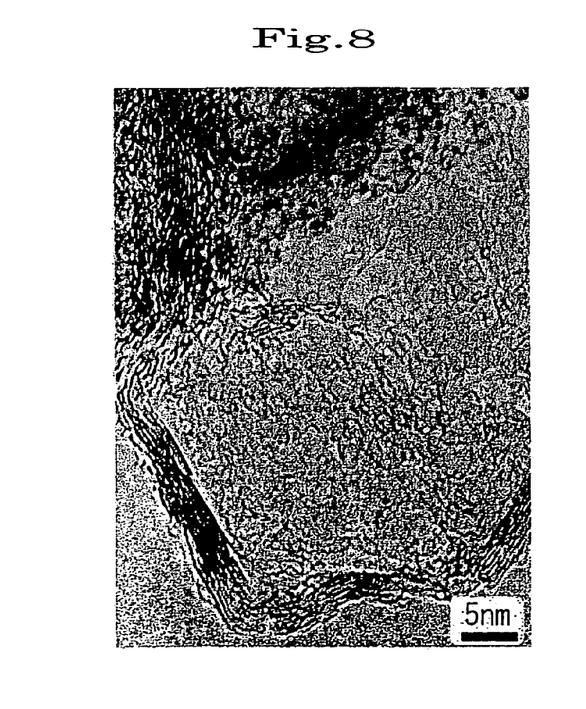
FIG. 8 is a TEM photograph of a carbon nanoballoon structure in which an opening is formed by oxidation.
Figure 9:
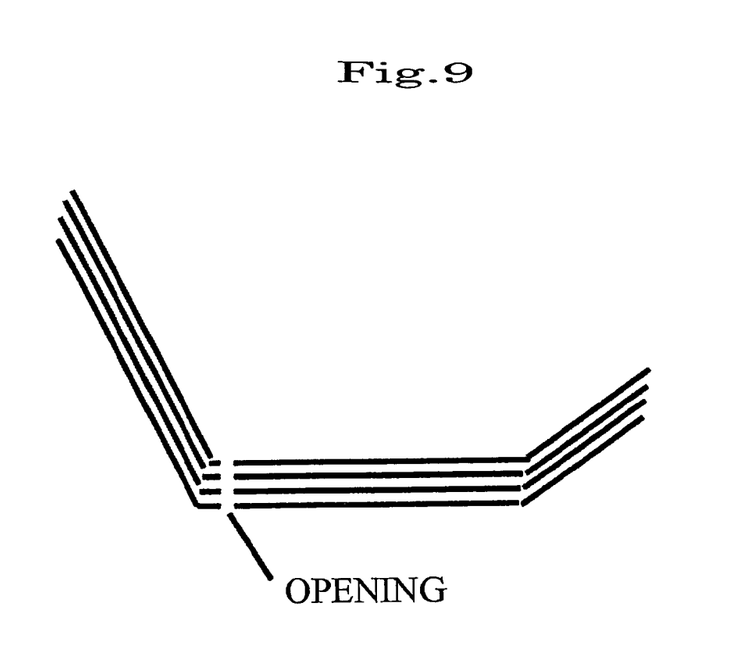
FIG. 9 is a schematic view of the TEM photograph shown in FIG. 8.

Specifically, it is preferable to oxidize the carbon nanoballoon structure in an oxygen-containing atmosphere at a temperature of 400 to 700° C., and preferably about 600° C. (550 to 650° C.). An opening with a diameter of 0.1 to 50 nm (corresponding to the size of a carbon atom) is formed by oxidizing the carbon nanoballoon structure in this temperature range. FIG. 8 shows the TEM observation result of the carbon nanoballoon structure in which an opening is formed, and FIG. 9 is a schematic view of the carbon nanoballoon structure. Oxidation may not proceed at a temperature of less than 400° C., whereby an opening may not be formed. If the carbon nanoballoon structure is treated at a temperature exceeding 700° C., the balloon structure tends to be burned down.

Figure 10:
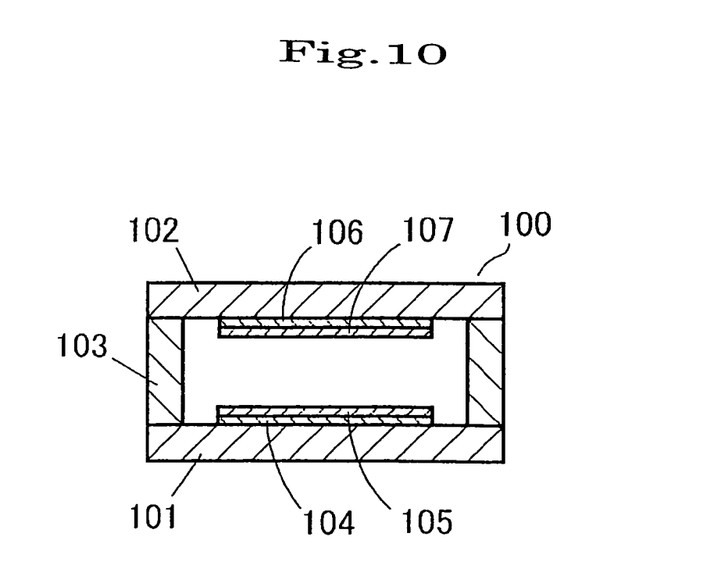
FIG. 10 is a cross-sectional view showing an example of an electron emitter device using the carbon nanoballoon structure according to the present invention as an electron emitter material.

The carbon nanoballoon structure according to the present invention has characteristics suitable for use as an electron emitter (field electron emitter), as described above. Embodiments of an electron emitter are described with reference to the drawings. FIG. 10 is a cross-sectional view showing an example of an electron emitter device including an electron emitter. In FIG. 10, a vacuum container 100 includes a glass substrate 101, a glass substrate 102, and a glass side plate 103 which seals the vacuum container 100 on the ends of the substrates. A cathode electrode 104 as a first electrode is formed on the glass substrate 101 by depositing a metal such as aluminum. A layer of an electron emitter material (emitter material) 105 is formed on the cathode electrode 104. The electron emitter material 105 is formed of the carbon nanoballoon structure according to the present invention, and applied to the cathode electrode 104 as a paste, for example. The cathode electrode 104 and the layer of the electron emitter material 105 may be integrally formed.

An anode electrode 106 as a second electrode (extractor electrode) is formed on the glass substrate 102 opposing the glass substrate 101 by depositing a metal such as aluminum so that the anode electrode 106 faces (is close to) the electron emitter material 105. A fluorescent material layer (e.g. ZnO: Zn) 107 is formed on the anode electrode 106 by screen printing or the like.

In this electron emitter device having a diode structure, when applying a voltage between the cathode electrode 104 and the anode electrode 106, electrons are emitted from the electron emitter material 105 formed of the carbon nanoballoon structure according to the present invention which is connected to the cathode electrode 104. The emitted electrons are drawn toward the anode electrode 106 and collide with the fluorescent material layer 107 to emit light. In this case, since the carbon nanoballoon structures have a uniform particle diameter and radius of curvature, the field intensity is easily made almost uniform when applying a voltage.

Figure 11:
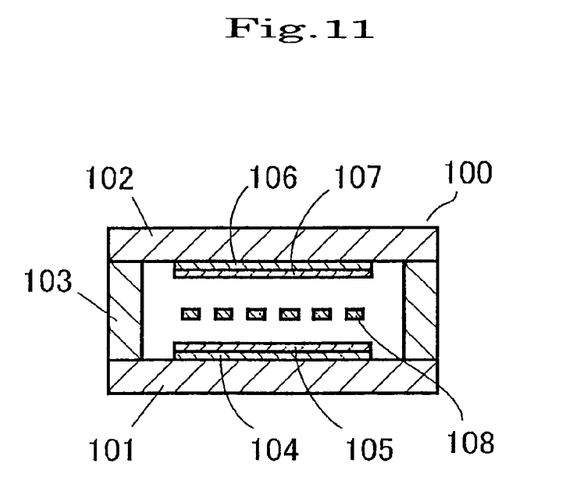
FIG. 11 is a cross-sectional view showing another example of an electron emitter device using the carbon nanoballoon structure according to the present invention as an electron emitter material.

FIG. 11 is a cross-sectional view showing another example of an electron emitter device. In FIG. 11, the same members as those shown in FIG. 10 are designated by the same reference numerals. The electron emitter device shown in FIG. 11 differs from the device shown in FIG. 10 in that a grid electrode 108 formed of a metal mesh is provided on the glass substrate 101 as the second electrode (extractor electrode) so that the grid electrode 108 faces (is close to) the electron emitter material 105.

In this electron emitter device having a triode structure, when applying a voltage between the cathode electrode 104 and the grid electrode (gate electrode) 108, electrons are emitted from the electron emitter material 105 formed of the carbon nanoballoon structure according to the present invention which is connected to the cathode electrode 104. The emitted electrons are drawn toward the anode electrode 106 and collide with the fluorescent material layer 107 to emit light. In this case, since the carbon nanoballoon structures have a uniform particle diameter and radius of curvature, the field intensity is easily made almost uniform when applying a voltage.

Figure 12:
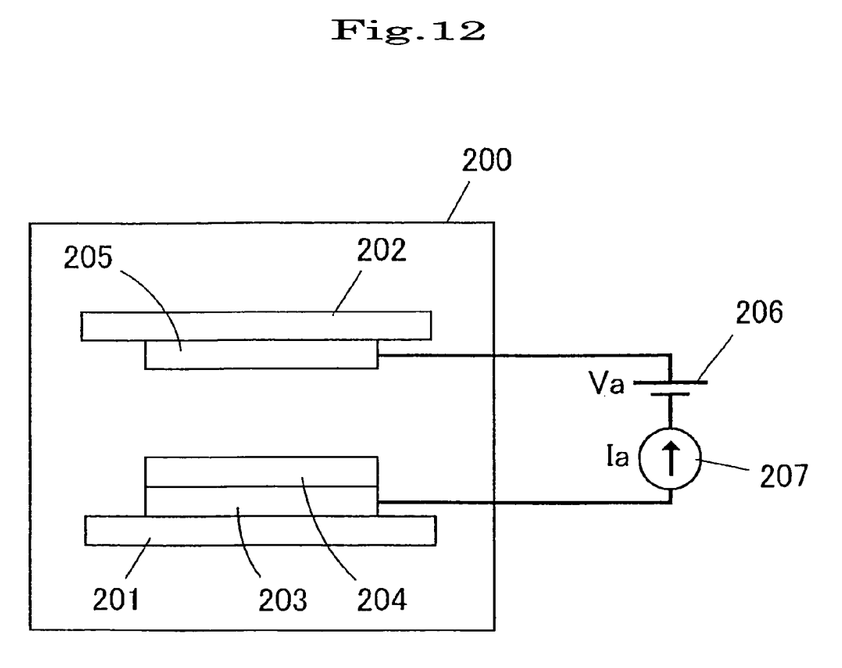
FIG. 12 is a view schematically showing a device for measuring electron emission properties of an electron emitter (electron source) when using the carbon nanoballoon structure according to the present invention as an electron emitter material.

The measurement results of the electron emission properties of the carbon nanoballoon structure as an electron source are described below. FIG. 12 shows a device for measuring the electron emission properties of an electron emitter device in which the carbon nanoballoon structure according to the present invention is used as the electron emitter material.

As shown in FIG. 12, a cathode substrate 201 formed of glass and an anode substrate 202 also formed of glass are opposedly arranged in a vacuum chamber 200 of the measuring device. A cathode electrode 203 formed of indium tin oxide (ITO) and an emitter layer including a carbon nanoballoon structure 204 according to the present invention are formed on the cathode substrate 201. An anode electrode (extractor electrode) 205 formed of aluminum is provided on the anode substrate 202.

The distance between the cathode substrate 201 and the anode substrate 202 was set at 50 microns. A direct current source 206 and an ammeter 207 were connected in series between the cathode electrode 203 and the anode electrode 205, and the carbon nanoballoon structure 204 was used as the electron emitter material. The electron emission properties of the carbon nanoballoon structure 204 as the electron emitter (electron source) were measured. The results are shown in FIGS. 13 and 14 (CNB denotes the carbon nanoballoon structure).

Figure 13:
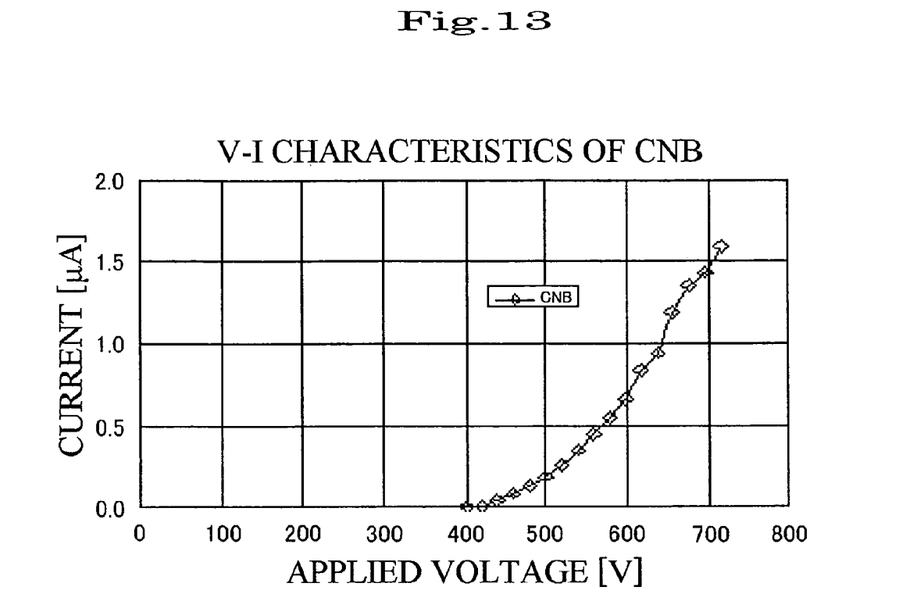
FIG. 13 is a graph showing voltage (V)-current (I) characteristics of the carbon nanoballoon structure according to the present invention measured using the measuring device shown in FIG. 12.
Figure 14:
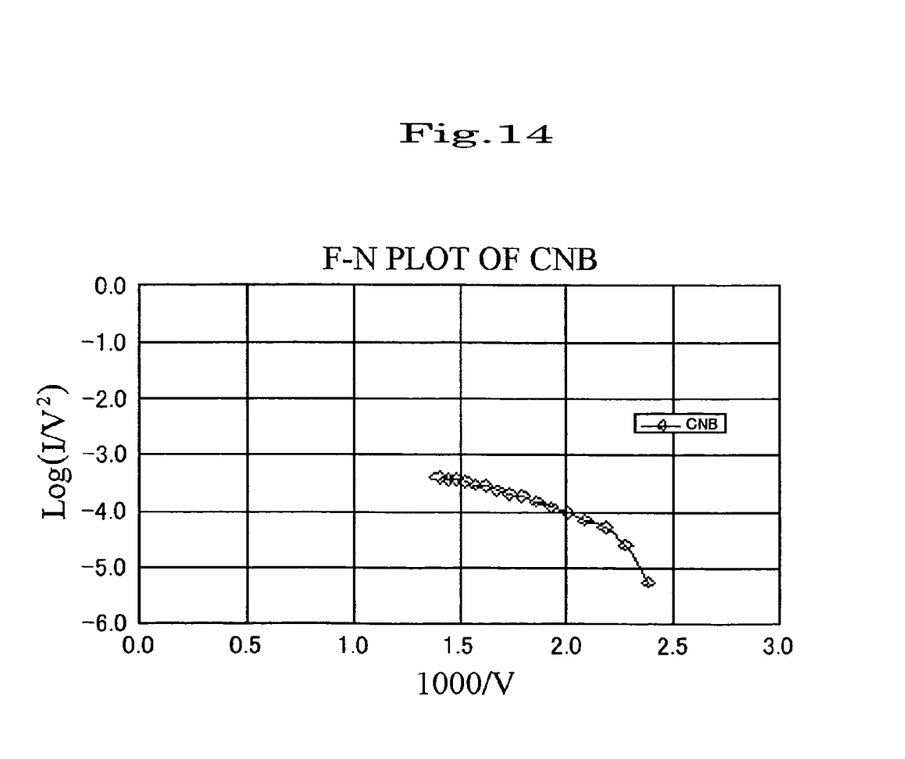
FIG. 14 shows a Fowler-Nordheim (F-N) plot of the carbon nanoballoon structure according to the present invention measured using the measuring device shown in FIG. 12.

FIG. 13 shows the evaluation results of the voltage (V)-current (I) characteristics, and FIG. 14 shows a Fowler-Nordheim (F-N) plot. As shown in FIGS. 13 and 14, it was confirmed that electrons are emitted from the electron source upon application of an electric field.

A case of applying the carbon nanoballoon structure according to the present invention as a gas storage material is described below. In this case, a specific gas (hydrogen, nitrogen, another gas, or a mixture thereof) is introduced into a container and allowed to remain. After introducing the carbon nanoballoon structure into the specific gas atmosphere in the container, the carbon nanoballoon structure is heated or pressurized. Specifically, the specific gas is introduced into the hollow portion (including the inner wall surface) of the carbon nanoballoon structure by thermal or mechanical treatment, and the specific gas is optionally discharged from the hollow portion to the outside of the outer shell by heating, pressurization, or the like. The carbon nanoballoon structure may be utilized as a gas storage material by introducing the specific gas into the hollow portion of the carbon nanoballoon structure and discharging the specific gas from the hollow portion. The above method illustrates the case where the specific gas is introduced into the carbon nanoballoon structure after producing the carbon nanoballoon structure. It is also possible to introduce the specific gas during production of the carbon nanoballon structure. The specific gas may be introduced into the gap formed in a particle in which the carbon nanoballoon structures aggregate.

EXAMPLES

The present invention is described below by way of examples and comparative examples to demonstrate the effects of the present invention. Note that the following examples illustrate one aspect of the present invention. The present invention is not limited to these examples.

Example 1

Soot prepared by arc discharge using two graphite electrodes in a nitrogen atmosphere was heated at 2800° C. for one hour in an argon gas atmosphere using a Tammann furnace. The resulting soot was observed using a transmission electron microscope (TEM). It was confirmed that hollow structures were formed in which graphite sheets were linked to form a curved surface and which entirely or partially had various shapes such as a sphere, a gourd-like shape, or a triangular pyramidal shape. About 70% or more of the particles had a number of graphite sheets of 10 to 16, a diameter of the structure of 30 to 100 nm, and a void content of the hollow portion of 45 to 80%. The maximum major axis was 500 nm, and the minimum minor axis was 20 nm. A structure in which two or more particles were bonded was also observed. The DBP absorption indicating the degree of structure was about 100 ml/100 g.

A similar carbon nanoballoon structure was also obtained when heating soot, prepared by an arc discharge using two graphite electrodes in an oxygen atmosphere, at 2800° C. in an argon atmosphere. When performing an arc discharge in an oxygen atmosphere, the amount of soot prepared was small. On the other hand, the amount of refuse such as carbon fragments mixed during synthesis was reduced. A similar carbon nanoballoon structure was also obtained when heating soot, prepared by an arc discharge in a hydrogen atmosphere, at 2800° C. in an argon atmosphere. There was no significant difference between the carbon nanoballoon structure produced by heating the soot prepared by an arc discharge in a hydrogen atmosphere and the carbon nanoballoon structure produced by heating the soot prepared by an arc discharge in a nitrogen atmosphere. A similar nanoballoon structure was also obtained when heating soot, prepared by an arc discharge in a mixed atmosphere of nitrogen and oxygen at a ratio of 8:2, at 2800° C. in an argon atmosphere. The amount of refuse such as carbon fragments was reduced in comparison with the case of performing an arc discharge in an atmosphere containing only nitrogen. It was confirmed that similar carbon nanoballoon structures were produced by heating soot prepared by an arc discharge at 2800° C. in an argon atmosphere, even if the arc discharge is performed in a nitrogen atmosphere, an oxygen atmosphere, a hydrogen atmosphere, or a mixed atmosphere of one or more gases selected from nitrogen, oxygen, and hydrogen. A test was also conducted on soot prepared by laser irradiation application to carbon while changing the atmosphere. It was confirmed that the same results as for arc discharge were obtained. The same results were also obtained when the inert gas used for heating at a high temperature was changed from argon to helium.

Example 2

Commercially available Ketjenblack (Ketjenblack EC-600JD produced by Ketjenblack International Corporation) was heated at 2800° C. for one hour in an argon gas atmosphere using a Tammann furnace. The resulting soot was observed using a TEM. About 70% or more of the particles were carbon nanoballoon structures with a number of graphite sheets of 8 to 14, a diameter of 30 to 50 nm, and a void content of 40 to 75%.

Example 3

The carbon nanoballoon structure obtained in Example 1 was oxidized in air at 600° C. for one hour. The specific surface area of the resulting carbon nanoballoon structure doubled to 70 $m^2/g$ from 35 $m^2/g$ before oxidation. This indicates that an opening reaching the hollow portion was formed in the structure. The oxidized structure was observed using a TEM. The opening had a diameter of 5 to 20 nm.

Comparative Example 1

Figure 15:
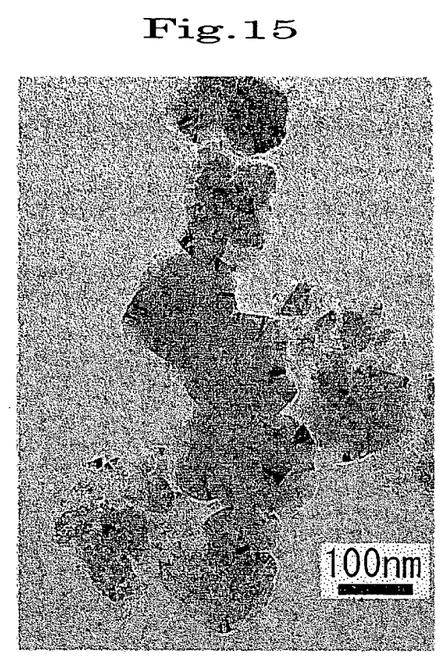
FIG. 15 is a TEM photograph of commercially available carbon black (SEAST S produced by Tokai Carbon Co., Ltd.) after heating at 2800° C., in which a solid structure filled with graphite sheets is formed.

Commercially available carbon black (SEAST S produced by Tokai Carbon Co., Ltd.) was heated at 2800° C. for one hour in an argon gas atmosphere using a Tammann furnace. The resulting soot was observed using a TEM. As shown in FIG. 15, it was confirmed that a solid structure filled with graphite sheets was formed.

Comparative Example 2

Figure 16:
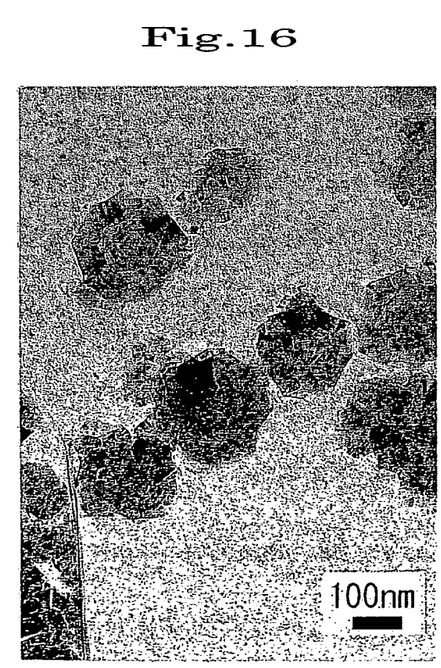
FIG. 16 is a TEM photograph of commercially available carbon black (Asahi Thermal produced by Asahi Carbon Co., Ltd.) after heating at 2800° C., in which a solid structure filled with graphite sheets is formed.

Commercially available carbon black (Asahi Thermal produced by Asahi Carbon Co., Ltd.) was heated at 2800° C. for one hour in an argon gas atmosphere using a Tammann furnace. The resulting soot was observed using a TEM. As shown in FIG. 16, it was confirmed that a solid structure filled with graphite sheets was formed.

Comparative Example 3

A carbon nanotube was obtained by an arc discharge using two graphite electrodes containing a metal catalyst. The resulting carbon nanotube was heated at 2800° C. for one hour in an argon gas atmosphere using a Tammann furnace. As a result of TEM observation, a change in the structure due to heating was not observed.

Comparative Example 4

The carbon nanoballoon structure obtained in Example 1 was oxidized in air at 350° C. for one hour. The specific surface area of the resulting carbon nanoballoon structure was 35 $m^2/g$, which is the same as that before oxidation. Therefore, it was confirmed that an opening reaching the hollow portion was not formed in the structure. The oxidized carbon nanoballoon structure was observed using a TEM. A change in the carbon nanoballoon structure due to oxidation was not observed.

Comparative Example 5

The carbon nanoballoon structures obtained in Example 1 were oxidized in air at 750° C. for one hour. When observing the oxidized carbon nanoballoon structures using a TEM, only fragments of the carbon nanoballoon structures were observed. This indicates that most of the carbon nanoballoon structures were burned down.

INDUSTRIAL APPLICABILITY

Since the carbon nanoballoon structure according to the present invention can be provided with an opening reaching the hollow portion by oxidation or the like, the carbon nanoballoon structure may be utilized as a capsule. There may be a case where two or more balloons are bonded to form a structure. Such a structure is expected to exhibit excellent electrical conductivity and reinforcement effects as a filler for composite materials.

Application examples of the carbon nanoballoon structure according to the present invention include cell electrode materials for primary cells, secondary cells, fuel cells, and the like, electron emitters, gas storage devices, gas/liquid purification devices, gas/liquid reforming devices, additives for rubber, resins (plastic), urethane, and elastomer, lubricants, abrasives, cutting agents, light-absorbing materials, paste, cosmetics, capsules for drugs, and the like. In particular, since the carbon nanoballoon structure according to the present invention has a uniform particle diameter, the field intensity is easily made almost uniform when applying a voltage. Therefore, the carbon nanoballoon structure is suitable as an electron emitter.

The invention claimed is:

1. A method of producing a carbon nanoballoon structure having a hollow portion, comprising the step of heating carbon black having a specific surface area of at least 1000 $m^2/g$ and a primary particle diameter of at least 20 nm to a temperature of at least 2000° C. in an inert gas atmosphere.

2. A method of producing a carbon nanoballoon structure having a hollow portion and an opening having a diameter of 0.1 to 50 nm which extends to the hollow portion, which comprises the steps of heating carbon black having a specific surface area of at least 1000 $m^2/g$ and a primary particle diameter of at least 20 nm to a temperature of at least 2000° C. in an inert gas atmosphere to form a carbon nanoballoon structure having a hollow portion and oxidizing the carbon nanoballoon structure having a hollow portion at a temperature of 400-700° C. in an oxygen-containing atmosphere to form the carbon nanoballoon structure having a hollow portion and an opening having a diameter of 0.1 to 50 nm which extends to the hollow portion.

* * * * *